United States Patent
Lee

(10) Patent No.: US 9,571,369 B2
(45) Date of Patent: Feb. 14, 2017

(54) APPARATUS AND METHOD FOR DATA ACQUISITION

(71) Applicant: LSIS CO., LTD., Anyang-si, Gyeonggi-do (KR)

(72) Inventor: Yong Ik Lee, Hwaseong-si (KR)

(73) Assignee: LSIS CO., LTD., Anyang-si (KR)

(*) Notice: Subject to any disclaimer, the term of this patent is extended or adjusted under 35 U.S.C. 154(b) by 151 days.

(21) Appl. No.: 14/248,208

(22) Filed: Apr. 8, 2014

(65) Prior Publication Data

US 2014/0344445 A1 Nov. 20, 2014

(30) Foreign Application Priority Data

May 14, 2013 (KR) .................. 10-2013-0054108

(51) Int. Cl.
   *H04L 12/26* (2006.01)
   *G06F 3/06* (2006.01)
   *G06Q 50/04* (2012.01)

(52) U.S. Cl.
   CPC ........... *H04L 43/0876* (2013.01); *G06F 3/067* (2013.01); *G06F 3/0614* (2013.01); *G06F 3/0649* (2013.01); *G06Q 50/04* (2013.01); *Y02P 90/30* (2015.11)

(58) Field of Classification Search
   None
   See application file for complete search history.

(56) References Cited

U.S. PATENT DOCUMENTS

| | | | | |
|---|---|---|---|---|
| 5,867,668 A | * | 2/1999 | Spirakis | G06F 11/1461 709/212 |
| 7,640,427 B2 | * | 12/2009 | Callas | H04L 63/0823 380/277 |
| 8,244,914 B1 | * | 8/2012 | Nagarkar | G06Q 10/107 707/609 |
| 2003/0147509 A1 | * | 8/2003 | LaVelle | H04M 1/656 379/68 |
| 2003/0198188 A1 | * | 10/2003 | Castlebury | E21B 47/00 370/252 |
| 2004/0184583 A1 | * | 9/2004 | Nagamine | A61B 6/04 378/209 |

(Continued)

FOREIGN PATENT DOCUMENTS

| | | |
|---|---|---|
| JP | 2007-235772 | 9/2007 |
| JP | 2010-061562 | 3/2010 |

(Continued)

OTHER PUBLICATIONS

Plantwide Event Historian, DeltaV Product Data Sheet, XP055141807, Jan. 2013, 10 pages.

(Continued)

*Primary Examiner* — Ninos Donabed
(74) *Attorney, Agent, or Firm* — Lee, Hong, Degerman, Kang & Waimey

(57) ABSTRACT

A data acquisition apparatus is provided. The data acquisition apparatus includes a local data storage unit; a data acquisition unit acquiring data; and a control unit storing data acquired by the data acquisition unit in the local data storage unit, wherein when stored data exceeds a predetermined capacity, the control unit transmits data to a history server, and when it is confirmed by the history server that data transmission is successful, the control unit deletes corresponding data from the local data storage unit.

1 Claim, 2 Drawing Sheets

(56) References Cited

U.S. PATENT DOCUMENTS

| | | | | |
|---|---|---|---|---|
| 2005/0055521 A1* | 3/2005 | Saika | ........ | G06F 11/1032 711/162 |
| 2005/0204104 A1* | 9/2005 | Aoshima | ........ | G06F 11/1448 711/161 |
| 2006/0047796 A1* | 3/2006 | Wheeler | ........ | G06Q 10/087 709/223 |
| 2006/0047924 A1* | 3/2006 | Aoshima | ........ | G06F 3/061 711/161 |
| 2010/0070475 A1* | 3/2010 | Chen | ........ | G06F 11/1461 707/640 |
| 2010/0201845 A1* | 8/2010 | Feinberg | ........ | G06F 9/445 348/231.99 |
| 2010/0257140 A1* | 10/2010 | Davis | ........ | G06F 17/30073 707/661 |
| 2011/0138043 A1* | 6/2011 | Sakuma | ........ | G06F 17/30749 709/224 |
| 2011/0264289 A1* | 10/2011 | Sawyer | ........ | H01L 31/02021 700/287 |
| 2012/0102280 A1* | 4/2012 | Nasu | ........ | G06F 11/1453 711/162 |
| 2013/0086418 A1* | 4/2013 | Sakurai | ........ | G06F 11/1412 714/15 |
| 2013/0246580 A1* | 9/2013 | Ozawa | ........ | H04L 67/06 709/219 |

FOREIGN PATENT DOCUMENTS

| | | |
|---|---|---|
| JP | 2011-048458 | 3/2011 |
| WO | 94/17473 | 8/1994 |

OTHER PUBLICATIONS

European Patent Office Application Serial No. 14162265.4, Search Report dated Oct. 1, 2014, 6 pages.

Korean Intellectual Property Office Application Serial No. 10-2013-0054108, Office Action dated Jul. 23, 2014, 3 pages.

* cited by examiner

APPARATUS AND METHOD FOR DATA ACQUISITION

CROSS-REFERENCE TO RELATED APPLICATIONS

Pursuant to 35 U.S.C. §119(a), this application claims the benefit of earlier filing date and right of priority to Korean Application No. 10-2013-0054108, filed on May 14, 2013, the contents of which is incorporated by reference herein in its entirety.

BACKGROUND

The present disclosure relates to an apparatus and method for data acquisition, and more particularly, to a lossless real-time data acquisition apparatus and method that acquires data; manages data depending on whether a history server succeeds in transmitting data, thus deletes data from a local data storage unit if positive and maintains data if negative; and attempts to re-transmit data to prevent data from becoming lost.

A supervisory control and data acquisition (SCADA) system performs monitoring and control remotely on various industrial facilities and acquires data.

For example, the SCADA system installs and operates a system that may obtain data such as an open and close state of a circuit breaker, a bus voltage, and wire data from a substation for power supply facility automation and control the opening and closing of the circuit breaker and the tap change of the substation.

The SCADA system includes a data acquisition apparatus acquiring data and a history server storing the history of acquired data.

Typically, the data acquisition apparatus regularly transmits data to a predetermined history server if acquiring data. However, there is a limitation in that data transmitted from the acquisition apparatus to the history server while communication between the data acquisition apparatus and the history server is disconnected is lost.

SUMMARY

Embodiments provide an apparatus and method for data acquisition that acquires data; manages data depending on whether data transmission to a history server is successful, thus deletes corresponding data from a local data storage unit if positive and maintains data if negative; and attempts to re-transmit data to prevent data from becoming lost.

In one embodiment, a data acquisition apparatus linked to a history server for the monitoring and control of an industrial facility includes a local data storage unit; a data acquisition unit acquiring data; and a control unit storing data acquired by the data acquisition unit in the local data storage unit, wherein when stored data exceeds a predetermined capacity, the control unit transmits data to a history server, and when it is confirmed by the history server that data transmission is successful, the control unit deletes corresponding data from the local data storage unit.

When it is not confirmed by the history server that data transmission is successful, the control unit may maintain corresponding data in the data acquisition unit and attempt to re-transmit data to the history server.

The control unit may transmit, to the history server, data acquired by the data acquisition unit and stored in the local storage unit, when a predetermined data acquisition time is exceeded.

The control unit may determine whether communication with the history server is in a normal state, and attempt to transmit data to the history server only if positive.

In another embodiment, a data acquisition method of a data acquisition apparatus linked to a history server for the monitoring and control of an industrial facility includes acquiring data by a data acquisition unit; and storing, by a control unit, the acquired data in a local data storage unit, transmitting, by the control unit, data to a history server when stored data exceeds a predetermined capacity, and deleting, by the control unit, corresponding data from the local data storage unit when it is confirmed by the history server that data transmission is successful.

The data acquisition method may further include: maintaining, by the control unit, corresponding data in the data acquisition unit when it is not confirmed by the history server that data transmission is successful: and attempting, by the control unit, to re-transmit data to the history server.

The data acquisition method may further include transmitting, by the control unit to the history server, data acquired by the data acquisition unit and stored in the local storage unit, when a predetermined data acquisition time is exceeded.

The data acquisition method may further include: determining, by the control unit, whether communication with the history server is in a normal state; and attempting, by the control unit, to transmit data to the history server only if positive.

The details of one or more embodiments are set forth in the accompanying drawings and the description below. Other features will be apparent from the description and drawings, and from the claims.

DETAILED DESCRIPTION OF THE EMBODIMENTS

Figure 1:
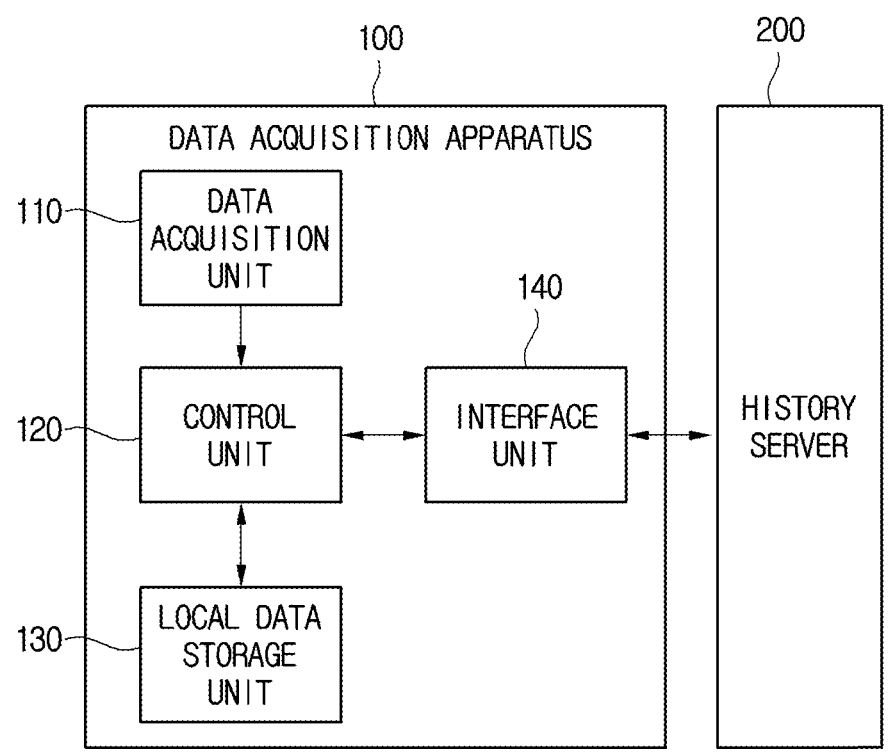
FIG. 1 is a block diagram of a lossless real-time data acquisition apparatus according to an embodiment.

Various embodiments are described below in detail with reference to the accompanying drawings. The following embodiments are provided as examples so that the spirit of the present invention may be sufficiently delivered to a person skilled in the art. Thus, the present invention is not limited embodiments to be described below but may be implemented in other forms. In addition, the width, length, and thickness of components in the drawings may be exaggerated for convenience. The same reference numerals represent the same components throughout the disclosure.

FIG. 1 is a block diagram of a lossless real-time data acquisition apparatus according to an embodiment.

Referring to FIG. 1, a lossless real-time data acquisition apparatus 100 according to an embodiment may be linked to a history server 200 for the monitoring and control of an industrial facility.

The data acquisition apparatus 100 may include a data acquisition unit 110, a control unit 120, a local data storage unit 130, and an interface unit 140.

The data acquisition unit 110 may collect data.

For example, the data acquisition unit 110 may obtain real-time data on an industrial facility to be controlled, from a data source such as an OPC server.

The control unit 120 stores data acquired by the data acquisition unit 110 in a local data storage unit 130. The control unit 120 transmits data to the history server 200 if stored data exceeds a predetermined capacity.

If it is confirmed by the history server 200 that data is successfully transmitted, the control unit 120 may delete corresponding data from the local data storage unit 130.

However, if it is not confirmed by the history server 200 that data is successfully transmitted, the control unit 120 maintains corresponding data in the local data storage unit 130 as is.

Then, the control unit 120 determines as transmission failure when the data transmitted to the history server 200 is not successfully transmitted, and checks a communication state with the history server 200. The control unit 120 attempts to re-transmit corresponding data to the history server 200.

The control unit 200 may determine whether to transmit data to the history server 20, depending on whether a predetermined data acquisition time exceeds, even if stored data does not exceed a predetermined capacity.

The control unit 120 checks the data acquisition time of the data acquisition unit 110 in real time and counts a time from when the data acquisition unit 110 acquires data for the last time. When a corresponding counted time is within a predetermined data acquisition time, the control unit 120 does not transmit data stored in the data acquisition unit 120 to the history server 200 but maintains it in the data acquisition unit 120. However, when a corresponding counted time exceeds a predetermined data acquisition time, the control unit 120 may perform a procedure of transmitting, to the history server 200, data that is acquired through the data acquisition unit 110 and then stored in the local data storage unit 130.

The local data storage unit 130 stores various pieces of data on an industrial facility acquired by the data acquisition unit 110. The local data storage unit stores data acquired by the data acquisition unit 110 according to a store command by the control unit 120. The local data storage unit transmits, to the interface unit 140, data stored by the store command by the control unit 120 in order to store it to the history server. The local data storage unit 130 deletes data that is successfully transmitted to the history server 200, according to a delete command of the control unit 120.

The interface unit 140 is a wired or wireless communication network interface for communicating with the history server 200.

Figure 2:
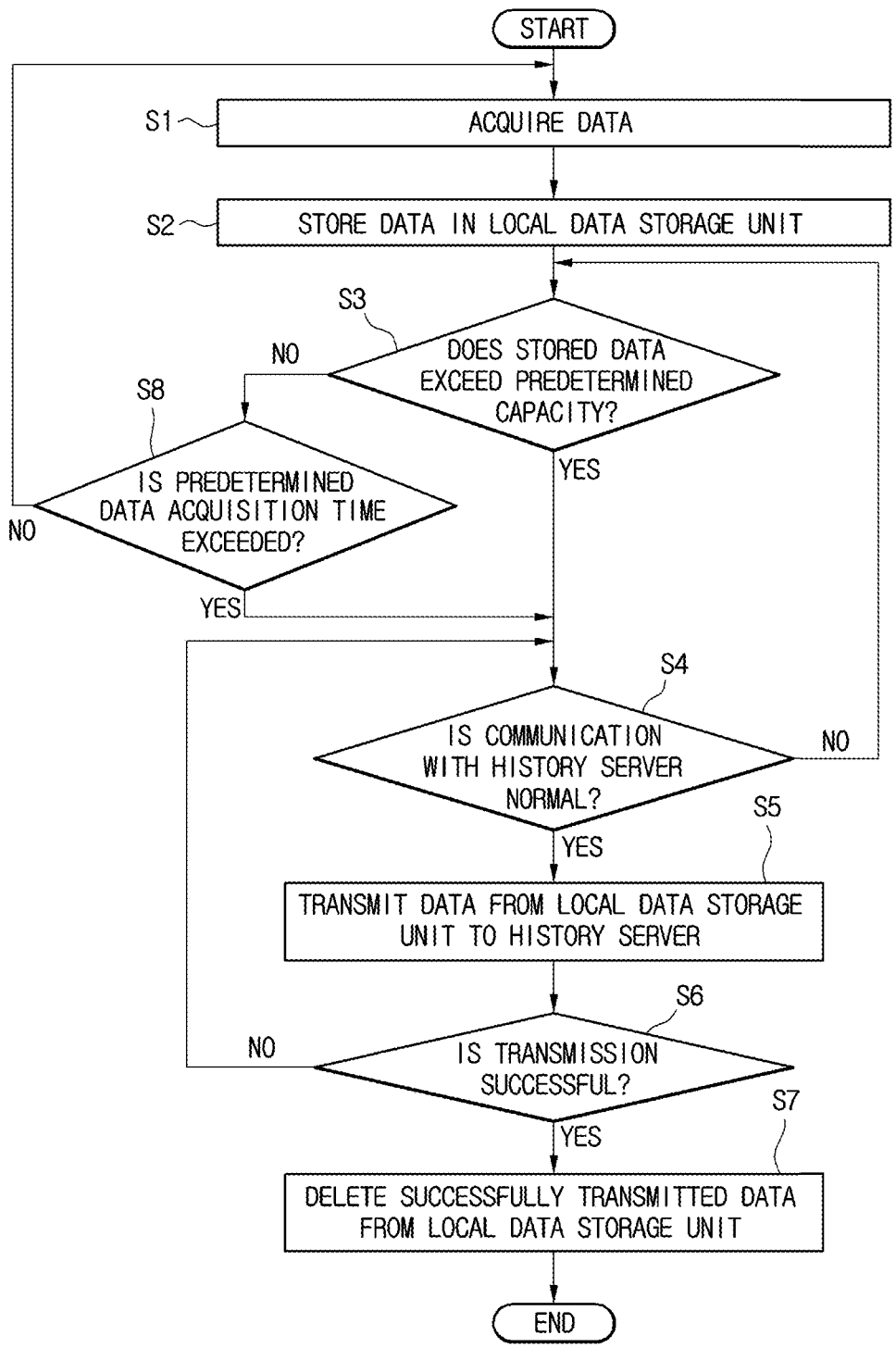
FIG. 2 is a flow chart of a lossless real-time data acquisition method according to an embodiment.

FIG. 2 is a flow chart of a lossless real-time data acquisition method according to an embodiment.

Referring to FIG. 2, the data acquisition unit 110 of the data acquisition apparatus 100 acquires data from various industrial facilities in step S1.

The control unit 120 stores acquired data in the local data storage unit 130 in step S2.

The control unit 120 determines whether data stored in the local data storage unit 130 exceeds a predetermined capacity for determining whether to transmit data, in step S3.

If data stored in the local data storage unit 130 exceeds a predetermined capacity, the control unit 120 determines whether communication with the history server 200 is normal, in step S3.

When the communication with the history server 200 is normal, the control unit 120 transmits data stored in the local data storage unit 130 to the history server 200 through the interface unit 140 in step S5.

After transmitting the data to the history server 200, the control unit 120 determines whether transmission is successful, in step S6.

If any data is received from the data acquisition apparatus 100, the history server 200 stores corresponding data in the history server 200. In addition, if corresponding data is stored, the history server 200 transmits, to the data acquisition apparatus 100, a signal informing that transmission is successful. Thus, the control unit 120 determines as transmission success if the signal informing that transmission is successful is received from the history server 200 within a certain time after transmitting data to the history server 200, and determines as transmission failure if not.

If the data transmitted to the history server 200 is determined as transmission success, the control unit 120 deletes corresponding data from the local data storage unit 130 in step S7.

On the other hand, if the data transmitted to the history server 200 is not determined as transmission success in step S6, the control unit 120 determines as transmission failure and again determines a communication state with the history server 200 in step S4. The control unit 120 repeats steps S4 and S5 to attempt to re-transmit corresponding data to the history server 200.

If stored data does not exceed a predetermined capacity in step S3, the control unit 200 determines whether a predetermined data acquisition time is exceeded, in step S8.

The predetermined data acquisition time is set as a time to determine when the control unit 120 continues only to store data acquired through the data acquisition unit 110 in the local data storage unit 130 without transmission.

That is, the control unit 120 continues to store data acquired through the data acquisition unit 110 in the local data storage unit 130 while the predetermined data acquisition time is not exceeded. However, even if data stored in the local data storage unit 130 does not exceed a predetermined capacity to be transmitted to the history server 200, the control unit 120 performs a procedure of transmitting corresponding data to the history server 200 when the predetermined data acquisition time is exceeded.

Thus, when the predetermined data acquisition time is exceeded, the control unit 120 may perform steps S4 and S5 to transmit corresponding data to the history server 200.

Accordingly, since it is possible to effectively prevent history data from becoming delayed while the control unit 120 defers transmission until data acquired by the data acquisition unit 110 reaches a predetermined capacity to be transmitted to the history server 200, it is possible to ensure data to be stored in the history server 200 in real time.

According to embodiments, the data acquisition apparatus may acquire data; manage data depending on whether data transmission to the history server is successful, thus delete data from a local data storage unit if positive and maintain data if negative; and attempt to re-transmit data to prevent data from becoming lost.

While particular embodiments have been described in the detailed description of the present invention, several variations may be made without departing from the scope of the present invention. Therefore, the scope of the present invention should not be limited to the above-described embodiments but be defined by the following claims and equivalents thereof.

What is claimed is:

1. A data acquisition method of a data acquisition apparatus linked to a history server for the monitoring and control of an industrial facility, the data acquisition method comprising:

acquiring real-time data by a data acquisition unit;
storing, by a control unit, the acquired real-time data in a local data storage unit;
determining whether the stored data exceeds a predetermined capacity;
determining whether a predetermined data acquisition time is exceeded when the stored data does not exceed the predetermined capacity;
determining, by the control unit, whether communication with the history server is in a normal state for transmission-available;
attempting, by the control unit, to transmit the stored data to the history server only if the normal state is determined, the stored data does not exceed the predetermined capacity and the predetermined data acquisition time is exceeded;
deleting, by the control unit, the stored data that was transmitted when it is confirmed by the history server that the stored data is successfully transmitted; and
maintaining, by the control unit, the data in the data acquisition unit when it is not confirmed by the history server that the data transmission is successful and attempting, by the control unit, to re-transmit the data to the history server.

* * * * *